(12) United States Patent
Shiono (10) Patent No.: US 8,807,729 B2
(45) Date of Patent: Aug. 19, 2014

(54) INK SET FOR INK JET RECORDING, RECORDING APPARATUS, AND RECORDED MATTER

(75) Inventor: Shohei Shiono, Matsumoto (JP)

(73) Assignee: Seiko Epson Corporation (JP)

( * ) Notice: Subject to any disclaimer, the term of this patent is extended or adjusted under 35 U.S.C. 154(b) by 197 days.

(21) Appl. No.: 13/456,563

(22) Filed: Apr. 26, 2012

(65) Prior Publication Data

US 2012/0293578 A1 Nov. 22, 2012

(30) Foreign Application Priority Data

May 17, 2011 (JP) .................................. 2011-110292

(51) Int. Cl.
*G01D 11/00* (2006.01)
*B41J 2/01* (2006.01)
*B41J 29/38* (2006.01)

(52) U.S. Cl.
USPC .................. 347/100; 347/103; 347/9; 347/14

(58) Field of Classification Search
USPC ........................................ 347/9, 14, 100, 103
See application file for complete search history.

(56) References Cited

U.S. PATENT DOCUMENTS

| | | | | | |
|---|---|---|---|---|---|
| 3,900,633 | A | * | 8/1975 | Piron | ............................ 428/204 |
| 2007/0197684 | A1 | | 8/2007 | Yamashita et al. | |
| 2008/0273045 | A1 | * | 11/2008 | Morohoshi et al. | ........ 346/135.1 |
| 2010/0039463 | A1 | * | 2/2010 | Van Thillo et al. | ............... 347/9 |

FOREIGN PATENT DOCUMENTS

| | | |
|---|---|---|
| JP | 2007-223112 | 9/2007 |
| JP | 2011-020362 | 2/2011 |

* cited by examiner

*Primary Examiner* — Sarah Al Hashimi
(74) *Attorney, Agent, or Firm* — Harness, Dickey & Pierce, P.L.C.

(57) ABSTRACT

An ink set for ink jet recording is provided, the ink set including a first ink containing first resin particles and not substantially containing a colorant; and a second ink containing titanium oxide particles and containing the first resin particles in an amount less than 6 weight %, the second ink being ejected substantially at the same time as ejection of the first ink.

17 Claims, 1 Drawing Sheet

INK SET FOR INK JET RECORDING, RECORDING APPARATUS, AND RECORDED MATTER

Priority is claimed under 35 U.S.C. §119 to Japanese Application No. 2011-110292 filed on May 17, 2011, and is hereby incorporated by reference in its entirety.

BACKGROUND

1. Technical Field

The present invention relates to an ink set for ink jet recording, a recording apparatus, and a recorded matter.

2. Related Art

In recent years, a technique has been developed, in which white ink is used to form an image on a recording medium (including a light-transmissive recording medium) having a color other than white with the result that a white layer is formed (see, JP-A-2011-020362). In addition, printing is frequently performed onto the container and package of various products, and such printing is called label printing. The label printing is often performed onto a light-transmissive film, and a layer of white ink is preliminarily formed as a base layer on a printing surface in most cases. The formation of the base layer can enhance a property of hiding the back of the film, so that a high-quality image can be formed on the base layer.

Nowadays, an ink jet technique has come to be employed for such image formation. The ink jet technique can reduce the size of equipment as compared with a traditional printing technique and eliminate formation of proofs. The ink jet technique is therefore especially effective to variously perform printing in a small scale and is accordingly promising. In the case of recording information on the container and package of various products, the ink jet technique also generally involves formation of the base layer, and white ink has been developing for the formation of the base layer.

In the case of recording information on light-transmissive media, the base layer formed by using white ink needs to have several properties at least including a property to hide a background, good whiteness, and abrasion resistance. In order to satisfy such properties demanded for the base layer, several techniques have been proposed, in which white ink is applied onto a medium in a larger amount than usual or in which white ink appropriately contains a pigment and fixing resin.

In general, the increase in the amount of the white pigment to be contained in the base layer can enhance the hiding property and whiteness of the base layer, and the increase in the amount of the fixing resin to be contained in the base layer can enhance the abrasion resistance of the base layer. Although adjustment of these properties involves the amount of the white ink to be used (duty) to some extent, it is believed that the white pigment and fixing resin are preferably added to the white ink itself in a large amount in view of, for example, a recording rate.

In an attempt to increase the amount of the white pigment contained in the white ink, unfortunately, precipitation of the white pigment readily occurs. Furthermore, in an attempt to increase the amount of the fixing resin contained in the white ink, ink viscosity increases, and the fixing resin adheres to the white pigment and then becomes solidified (phenomenon called "hard cake"). These problems cause the preservation stability of the white ink to be decreased. Moreover, in the case of ejecting the white ink by an ink jet technique, problems such as clogging may occur. White ink free from these disadvantages is therefore demanded, however, the above requirements are less likely to be sufficiently satisfied only by the change of the composition of the white ink.

SUMMARY

An advantage of some aspects of the invention is to provide an ink set for ink jet recording, a recording apparatus, and a recorded matter formed by using the ink set and recording apparatus, the ink set and recording apparatus being able to imparting good whiteness, hiding property, and abrasion resistance to an image formed on a recording medium by an ink jet technique. Another advantage of some aspects of the invention is to provide an ink set for ink jet recording, the ink set having good preservation stability.

The invention provides the solution of at least part of the above disadvantages and has the following aspects and advantages.

According to a first aspect of the invention, an ink set for ink jet recording is provided, the ink set including: a first ink containing first resin particles and not substantially containing a colorant; and a second ink containing titanium oxide particles and containing the first resin particles in an amount less than 6 weight %, the second ink being ejected substantially at the same time as ejection of the first ink.

By virtue of the ink set for ink jet recording, an image is formed so as to have good whiteness, hiding property, and abrasion resistance. In particular, the titanium oxide particles contained in the second ink can impart good whiteness and hiding property to an image, and the first resin particles can impart good abrasion resistance to an image. In the ink set for ink jet recording, since the second ink, which contains the titanium oxide particles, contains a small amount of the first resin particles, the titanium oxide particles are less likely to adhere to the first resin particles with solidification, so that good preservation stability is exhibited.

The expression "ink does not substantially contain a specific component" herein means that the specific component has a limit in the contained amount so as not to sufficiently provide its benefit on purpose. For instance, the term refers to the case the ink contains the specific component in an amount less than 0.05 weight %, preferably less than 0.01 weight %, more preferably less than 0.005 weight %, and most preferably less than 0.001 weight %.

Single use of the term "resin particles" herein collectively refers to various types of resins such as the first and second resin particles.

In the ink set for ink jet recording, the second ink may not substantially contain the first resin particles.

In this case, since the second ink containing the titanium oxide particles does not substantially contain the first resin particles, the titanium oxide particles contained in the second ink are less likely to solidify. The second ink and the ink set for ink jet recording therefore have especially good preservation stability.

In the ink set for ink jet recording, the second ink may contain second resin particles which are different from the first resin particles.

In this case, the titanium oxide particles contained in the second ink can impart good whiteness and hiding property to an image, and the first and second resin particles can impart good abrasion resistance to the image.

In the ink set for ink jet recording, the first ink may contain the first resin particles in an amount that is in the range from 3 to 5 weight %.

In this case, since the first resin particles are added to the first ink which does not substantially contain the colorant, the resin particle content in the second ink can be decreased or excluded. Thus, the preservation stability of the second ink is further increased, and the first ink is prevented from the large increase in the viscosity. The ejection stability of the first ink can be accordingly enhanced.

In the ink set for ink jet recording, the material of the first resin particles may be an acrylic polymer.

In this case, the ink set for ink jet recording can contribute to formation of an image with further good whiteness, hiding property, and abrasion resistance.

In the ink set for ink jet recording, the first resin particles may have an average diameter that is in the range from 40 to 140 nm.

In this case, the ink set for ink jet recording can contribute to formation of an image with further good whiteness, hiding property, and abrasion resistance.

The ink set for ink jet recording may further include a third ink containing third resin particles different from the first resin particles and not substantially containing a colorant.

In this case, the first and second inks can be used to form a white image, and the second and third inks can be used to form another white image, individual images having different color phases.

According to a second aspect of the invention, a recording apparatus is provided, the recording apparatus including the ink set for ink jet recording, which has at least any one of the above advantages, and forming an image at a predetermined position on a recording medium by an ink jet technique.

The recording apparatus can form an image having good whiteness, hiding property, and abrasion resistance. In particular, the titanium oxide particles contained in the second ink can impart good whiteness and hiding property to an image, and at least first resin particles can impart good abrasion resistance to the image.

According to a third aspect of the invention, a recording apparatus is provided, the recording apparatus including the ink set for ink jet recording, which has at least any one of the above advantages. The recording apparatus has a first recording mode and a second recording mode, the first recording mode involving ejecting the first and second inks substantially at the same time and then applying the first and second inks to a predetermined position on a recording medium, and the second recording mode involving ejecting the first and second inks substantially not at the same time and then applying the first and second inks to a predetermined position on a recording medium.

In this case, since the recording apparatus has the first recording mode and the second recording mode, individual modes can be appropriately used depending on types of recording media and the degree of hiding of an image. The recording apparatus can therefore provide the good balance between time taken for image formation and reduction of the amount of the first and second inks to be used. Hence, a white base layer can be, for instance, further efficiently formed with the recording apparatus.

According to a fourth aspect of the invention, a recording apparatus is provided, the recording apparatus including the ink set for ink jet recording, which includes the third ink. The recording apparatus has a first recording mode, a second recording mode, and a third recording mode, the first recording mode involving ejecting the first and second inks substantially at the same time and then applying the first and second inks to a predetermined position on a recording medium, the second recording mode involving ejecting the first and second inks substantially not at the same time and then applying the first and second inks to a predetermined position on a recording medium, and the third recording mode involving ejecting the second and third inks substantially at the same time and then applying the second and third inks to a predetermined position on a recording medium.

In this case, since the recording apparatus has the first to third recording modes, individual modes can be appropriately used depending on the color phase of an image to be formed.

Any of the above recording apparatuses may have a determination unit that determines the optical transparency of the recording medium and select at least one of the individual modes for recording on the basis of the determination results of the determination unit.

In this case, the determination unit enables the individual modes to be selected on the basis of demanded whiteness, color phase, and hiding property. By virtue of the recording apparatus, a base layer can be, for example, therefore further efficiently formed.

According to a fifth aspect of the invention, a recorded matter is provided, the recorded matter being formed with the recording apparatus having any one of the above advantages.

In this case, an image can be formed so as to have good whiteness, hiding property, and abrasion resistance.

BRIEF DESCRIPTION OF THE DRAWINGS

The invention will be described with reference to the accompanying drawings, wherein like numbers reference like elements.

DESCRIPTION OF EXEMPLARY EMBODIMENTS

Some embodiments of the invention will be hereinafter described. The embodiments are described below as examples of the invention. The invention should not be limited to the embodiments. The invention is variously modified without departing from the scope of the invention. All of the configurations of the embodiments are not the essential parts of the invention.

1. Ink Set for Ink Jet Recording

In this embodiment, an ink set for ink jet recording includes a first ink and second ink. The ink set for ink jet recording is used to form an image at a predetermined position on a recording medium by an ink jet technique.

1. 1. First Ink

The first ink contains first resin particles. In addition, the first ink does not substantially contain a colorant. Thus, in the ink set of this embodiment, the first ink has the same characteristics as those of resin inks. The expression "the ink does not substantially contain a colorant" herein means that the colorant has a limit in the contained amount so as not to sufficiently provide its benefit on purpose. For example, the colorant content in the ink is less than 0.05 weight %, preferably less than 0.01 weight %, more preferably less than 0.005 weight %, and the most preferably less than 0.001 weight %. Single use of the term "resin particles" herein collectively refers to various types of resins such as the first and second resin particles.

Any material which serves to fix titanium oxide particles contained in the second ink onto a recording medium can be used as a material of the first resin particles contained in the first ink. Examples of such a material include particles of styrene-acrylic acid copolymers, vinyl chloride polymers, urethane polymers, acrylic acid polymers, and copolymers thereof. Among these, acryl-based materials can enhance the hiding property and whiteness of an image to be formed and is therefore preferably employed as the material of the first resin particles. In particular, styrene-acrylic acid copolymers, acrylic acid polymers, and copolymers thereof are especially preferably employed.

These polymeric materials of the first resin particles are free from a specific limit in the degree of polymerization. The materials may be in the form of oligomer or polymer. The polymeric materials used for the first resin particles accordingly may have a weight-average molecular weight Mw, for example, ranging from 100 to 100000, and preferably from 100 to 10000 in view of the dispersibility of the first resin particles.

The first resin particles disperse in the first ink. The first resin particles may disperse in the first ink in a state in which part of the individual first resin particles (for instance, the vicinity of the surface) is dissolved in a solution contained in the first ink while the inside of the individual first resin particles is undissolved. The first resin particles may be dispersed in the first ink with, for example, a surfactant to form emulsion or suspension.

Since the first resin particles disperse in the first ink, the average particle diameter of the dispersing first resin particles can be determined. The average particle diameter herein refers to volume-based average particle diameter. The volume-based average particle diameter can be measured, for example, as a result of analyzing the dispersing first resin particles with a laser diffraction particle size distribution analyzer by dynamic light scattering.

In the case where the first resin particles are in the form of fine particles, the average particle diameter is preferably in the range from 5 nm to 400 nm, more preferably in the range from 20 nm to 200 nm, further preferably in the range from 30 nm to 150 nm, even further preferably in the range from 40 nm to 140 nm, still further preferably in the range from 80 nm to 140 nm, and most preferably in the range from 100 nm to 140 nm, thereby sufficiently imparting preservation stability, ejection stability, an $L^*$ value in combination use with the second ink, and hiding property to the first ink.

The first ink contains the first resin particles in an arbitrary amount as long as the first ink is ejected by an ink jet technique. For instance, the amount of the first resin particles is in the range from 1 weight % to 10 weight % relative to the total amount of the first ink. In order to adjust the viscosity of the first ink within a range suitable for an ink jet technique, the amount of the first resin particles contained in the first ink is preferably in the range from 2 weight % to 7 weight %, more preferably in the range from 3 weight % to 5 weight %. The first resin particles within these content ranges enable solidification and fixation of an image formed on a recording medium by a recording method of this embodiment.

In application of the first and second inks onto a recording medium, the first resin particles function to fix the titanium oxide particles contained in the second ink onto the recording medium. In other words, the first resin particles serve to impart a property of being fixed onto a recording medium to an image formed by using the ink set of this embodiment for an ink jet recording. The first ink accordingly enables the fixing resin content in the second ink to be decreased, which enhances the preservation stability of the second ink.

Examples of methods for producing the first resin particles contained in the first ink include a technique which involves mixing the monomer of a desired resin with a polymerization catalyst (polymerization initiator) and a dispersant for polymerization (namely, emulsion polymerization); a technique which involves dissolving a resin with a hydrophilic moiety into a water-soluble organic solvent, then mixing the solution with water, and subsequently removing the water-soluble organic solvent by distillation; and a technique which involves dissolving a resin into a water-insoluble organic solvent and mixing the solution and a dispersant with an aqueous solution. These methods can be appropriately selected depending on types and properties of a resin to be used. A dispersant may be used to disperse the first resin particles, and exampled of the dispersant include anionic surfactants (such as sodium dodecylbenzenesulfonate, sodium lauryl phosphate, and polyoxyethylene alkyl ether sulfate ammonium salt) and nonionic surfactants (such as polyoxyethylene alkyl ether, polyoxyethylene alkyl ester, polyoxyethylene sorbitan fatty acid ester, and polyoxyethylene alkyl phenyl ether). These dispersants may be used alone or in combination.

The first resin particles may be commercially available products. Examples of the commercially available products include Microgel E-1002 and Microgel E-5002 (product names, manufactured by Nippon Paint Co., Ltd.); VONCOAT 4001 and VONCOAT 5454 (product names, manufactured by Dainippon Ink And Chemicals, Incorporated); Vinyblan 700 and Vinyblan 701 (product names, manufactured by Nissin Chemical Industry Co., Ltd.); RESAMINE D-1060 and RESAMINE D-4200 (product names, manufactured by Dainichiseika Color & Chemicals Mfg. Co., Ltd.); Mowinyl 742A and Mowinyl 972 (product names, manufactured by The Nippon Synthetic Chemical Industry Co., Ltd.); SAE1014 (product name, manufactured by ZEON CORPORATION), SAIVINOL SK-200 (product name, manufactured by SAIDEN CHEMICAL INDUSTRY CO., LTD.); and JONCRYL 7100, JONCRYL 390, JONCRYL 711, JONCRYL 511, JONCRYL 7001, JONCRYL 632, JONCRYL 741, JONCRYL 450, JONCRYL 840, JONCRYL 74J, JONCRYL HRC-1645J, JONCRYL 734, JONCRYL 852, JONCRYL 7600, JONCRYL 775, JONCRYL 537J, JONCRYL 1535, JONCRYL PDX-7630A, JONCRYL 352J, JONCRYL 352D, JONCRYL PDX-7145, JONCRYL 538J, JONCRYL 7640, JONCRYL 7641, JONCRYL 631, JONCRYL 790, JONCRYL 780, JONCRYL 7610, JONCRYL 61J (product names, manufactured by BASF Japan Ltd.).

The first ink may further contain a penetrant, saccharides, a dispersant, water, and other additives.

Penetrant

At least one material selected from alkanediols and glycol ethers is preferably used as the penetrant. Alkanediol and glycol ether enhance the wettability with respect to the recording surface of a recording medium, thereby increasing the permeability of the ink.

Examples of alkanediols include both-terminal diols such as 1,2-alkyldiol, 1,4-butanediol, 1,5-pentanediol, 1,6-hexanediol, and 1,7-heptanediol; and branched diols such as 3-methyl-1,3-butanediol, 2-ethyl-1,3-hexanediol, 2-methyl-1,3-propanediol, 2,4-dimethyl-1,5-pentanediol, and 3-(2-methoxyphenoxy)-1-2-propanediol. In this embodiment preferred are 1,2-alkanediols having four to eight carbon atoms, such as 1,2-butanediol, 1,2-pentanediol, 1,2-hexanediol, 1,2-heptanediol, and 1,2-octanediol. Among these, 1,2-hexanediol, 1,2-heptanediol, and 1,2-octanediol having six to eight carbon atoms have especially high permeability to a recording medium and are therefore preferably employed.

Example of glycol ethers include lower alkyl ethers of polyhydric alcohols, such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, triethylene glycol monobutyl ether, and tripropylene glycol monomethyl ether. Among these, triethylene glycol monobutyl ether can provide good recording quality.

In the case where the first ink contains at least one material selected from these alkanediols and glycol ethers, the amount of this material is preferably in the range from 1 weight % to 20 weight %, more preferably in the range from 1 weight % to 10 weight % relative to the total weight of the first ink.

Saccharides

Addition of saccharides to the first ink may increase the wettability of the first ink and therefore prevents the first ink from drying, thereby further enhancing an effect to prevent the occurrence of clogging in the recording head of an ink jet printer. Saccharides may be the combination of monosaccharides and a di- or higher saccharides, monosaccharides alone, or di- or higher saccharides alone. Saccharides to be used are appropriately determined depending on a demanded benefit. In particular, in the case of emphasizing an effect to prevent the solidification of the ink, the first ink may contain only di- or higher saccharides (not containing monosaccharides). In the case of using di- or higher saccharides alone, disaccharides and tri- or higher saccharides may be employed. The first ink may contain monosaccharides and di- or higher saccharides [such as oligosaccharide (including tri- and tetrasaccharides) and polysaccharides]. Examples of the monosaccharides and di- or higher saccharides include glucose, ribose, mannitol, mannose, fructose, xylose, arabinose, galactose, aldonic acid, glucitol, sorbitol, maltose, cellobiose, lactose, sucrose, trehalose, and maltotriose. The term "polysaccharides" herein broadly refers to various types of saccharides and include substances occurring in nature, such as alginic acid, α-cyclodextrin, and cellulose. Derivatives of these saccharides include reducing sugars of the above saccharides {for example, sugar alcohol [represented by the formula $HOCH_2(CHOH)_nCH_2OH$ (n is an integer from 2 to 5)]}, oxidized sugars (such as aldonic acid and uronic acid), amino acid, and thiosugar. Although types of saccharides are not specifically limited, preferred are reducing sugars, specifically, glucose and fructose.

In the case where the first ink contains monosaccharides and di- or higher saccharides, the amount of the monosaccharides is preferably in the range from 5 weight % to 50 weight %, more preferably in the range from 20 weight % to 45 weight % relative to the entire saccharide content in the first ink. Owing to the monosaccharide content within these ranges, the saccharides function as a moisturizing agent, thereby being able to prevent the occurrence of clogging in a recording head. In this case, the first ink further preferably contains trisaccharides. The trisaccharide content is not specifically limited and is preferably in the range from 3 weight % to 90 weight %, more preferably in the range from 25 weight % to 85 weight %. In the case of adding monosaccharides and di- or higher saccharides to the ink, the monosaccharides and di- or higher saccharides may be separately added, or the mixture of the monosaccharides and di- or higher saccharides (for instance, syrup) may be added.

Examples of commercially available reducing sugars include HS-500, HS-300, HS-60, HS-30, and HS-20 (manufactured by HAYASHIBARA CO., LTD.).

In the case where the first ink contains saccharides, the saccharide content is preferably in the range from 2 weigh % to 10 weight %, more preferably in the range from 5 weight % to 8 weight % relative to the total amount of the first ink.

Dispersant

The first ink can contain any type of dispersant which can be used for general pigment inks without specific limitation. Examples of the dispersant include cationic dispersants, anionic dispersants, nonionic dispersants, and surfactants. Although the first ink does not substantially contain a colorant, the dispersant can enhance the dispersibility of the first resin particles, for example.

Examples of the anionic dispersants include polyacrylic acid, polymethacrylic acid, acrylic acid-acrylonitrile copolymers, vinyl acetate-acrylate copolymers, acrylic acid-alkyl acrylate copolymers, styrene-acrylic acid copolymers, styrene-methacrylic acid copolymers, styrene-acrylic acid-alkyl acrylate copolymers, styrene-methacrylic acid-alkyl acrylate copolymers, styrene-α-methyl styrene-acrylic acid copolymers, styrene-α-methyl styrene-acrylic acid-alkyl acrylate copolymers, styrene-maleic acid copolymers, vinyl naphthalene-maleic acid copolymers, vinyl acetate-ethylene copolymers, vinyl acetate-fatty acid vinylethylene copolymers, vinyl acetate-maleate copolymers, vinyl acetate-crotonic acid copolymers, and vinyl acetate-acrylic acid copolymers. Examples of the nonionic dispersants include polyvinylpyrrolidone, polypropylene glycol, and vinyl pyrrolidone-vinyl acetate copolymers. Examples of the surfactants as the dispersant include anionic surfactants such as sodium dodecylbenzenesulfonate, sodium laurate, and ammonium salts of polyoxyethylene alkyl ether sulfate; and nonionic surfactants such as polyoxyethylene alkyl ethers, polyoxyethylene alkyl esters, polyoxyethylene sorbitan fatty acid esters, polyoxyethylene alkyl phenyl ethers, polyoxyethylene alkylamines, and polyoxyethylene alkylamides. In view of especially enhancing the dispersion staiblity of the firs resin particles, preferred are styrene-(meth)acrylic acid copolymers.

The first ink may contain acetylenic glycol surfactants or polysiloxane surfactants. The acetylenic glycol surfactants or the polysiloxane surfactants can enhance the wettability with respect to the recording surface of a recording medium, thereby increasing the permeability of the ink. The surfactant which can be contained as the dispersant in the first ink is not limited to the above surfactants, and traditional surfactants such as fluorochemical surfactants may be used.

Examples of the acetylenic glycol surfactants include 2,4,7,9-tetramethyl-5-decyne-4,7-diol, 3,6-dimethyl-4-octyne-3,6-diol, 3,5-dimethyl-1-hexyne-3-ol, and 2,4-dimethyl-5-hexyne-3-ol. Furthermore, commercially available acetylenic glycol surfactants may be used. Examples of the commercially available acetylenic glycol surfactants include Olfines E1010, STG, and Y (manufactured by Nissin Chemical Industry Co., Ltd.); and Surfynols 104, 82, 465, 485, and TG (manufactured by Air Products and Chemicals Inc.).

Commercially available polysiloxane surfactants may be used. Examples of the commercially available polysiloxane surfactants include BYK-347 and BYK-348 (manufactured by BYK Japan KK).

The dispersant content in the first ink is preferably in the range from 0.01 weight % to 5 weight %, more preferably in the range from 0.1 weight % to 0.5 weight % relative to the total amount of the first ink.

Water

The first ink may be an aqueous ink containing water in an amount of 50% or higher. Preferred examples of water include pure water, such as ion-exchanged water, ultrafiltrated water, reverse osmosis water, and distilled water; and ultrapure water. In particular, since sterilizing these types of water by, for example, ultraviolet irradiation or hydrogen peroxide addition can prevent growth of fungus and bacteria in the water over a long time, the sterilized water is preferably employed.

Other Additives

The first ink may appropriately contain additives, for instance, a fixing agent such as water-soluble rosin, a fungicide and preservation such as sodium benzoate, an antioxidant and ultraviolet absorber such as allophanate, a chelating agent, and an oxygen absorber. These additives may be used alone or in combination. Furthermore, the first ink may contain a pH adjuster and a corrosion inhibitor. Addition of these additives to the first ink may further enhance advantageous properties of the first ink.

Examples of the pH adjuster include potassium dihydrogenphosphate, disodium hydrogenphosphate, sodium hydroxide, lithium hydroxide, potassium hydroxide, ammonia, diethanolamine, triethanolamine, triisopropanolamine, potassium carbonate, sodium carbonate, and sodium hydrogen carbonate.

Examples of the preservation and fungicide include sodium benzoate, sodium pentachlorophenolate, sodium 2-pyridinethiol-1-oxide, sodium sorbate, sodium dehydroacetate, and 1,2-dibenzisothiazoline-3-one. Examples of commercially available products include Proxel XL2 and Proxel GXL (product names, manufactured by Avecia Corporation) and Denicides CSA and NS-500W (product names, manufactured by Nagase ChemteX Corporation).

Examples of the corrosion inhibitor include benzotriazole.

Examples of the chelating agent include ethylenediaminetetraacetic acid and salts thereof (such as disodium dihydrogen ethylenediaminetetraacetate).

The first ink may contain an organic solvent in addition to water as a solvent. Examples of the organic solvent include alkyl alcohols having one to four carbon atoms such as ethanol, methanol, butanol, propanol, isopropyl alcohol; 2-pyrrolidinone; formamide; acetamide; dimethylsulfoxide; sorbitol; sorbitan; acetin; diacetin; triacetin; sulfolane; glycerin; ethylene glycol; and propylene glycol. Use of these organic solvents enhances the permeability of the ink to a recording medium and prevents the occurrence of clogging. The organic solvents may be used alone or in combination and is contained in an amount approximately ranging from 0.1 weight % to 10 weight % relative to the total weight of the ink jet ink.

The first ink can be prepared with traditional equipment, such as a ball mill, sand mill, attritor, Basket mill, and roll mill, as in the preparation of typical pigment ink. In the preparation, a membrane filter and mesh filter can be preferably used to remove coarse particles.

1. 2. Second Ink

The second ink contains titanium oxide particles. The second ink does not substantially contain resin particles or contain the resin particles in an amount less than 6 weight % (the resin particle content is less than 6 weight %). In the case where the second ink contains the resin particles, the amount of the resin particles (total amount of the resin in the ink) is preferably in the range from 2 weight % to 6 weight %, more preferably in the range from 2 weight % to 5 weight %, and most preferably in the range from 2 weight % to 4.5 weight % in view of the whiteness and abrasion resistance.

Examples of the titanium oxide particles contained in the second ink include titanium dioxide particles which are prepared as a result of processing titanium dioxide into powder. The particle diameter and particle size distribution of the titanium oxide particles can be appropriately determined as long as the second ink can be ejected by an ink jet technique. In order to increase the whiteness and hiding property of an image to be formed, the titanium oxide particles have an average particle diameter that is preferably in the range from 150 nm to 500 nm, more preferably in the range from 250 nm to 400 nm, and most preferably in the range from 285 nm to 380 nm.

The amount of the titanium oxide particles (solid content) is preferably in the range from 1 weight % to 20 weight %, more preferably in the range from 5 weight % to 15 weight % relative to the total weight of the second ink.

In the case where the second ink contains the resin particles, the resin particles function to fix the titanium oxide particles, which are contained in the second ink, onto a recording medium. In addition, the resin particles may improve the whiteness and hiding property of an image formed by using the ink set of this embodiment for ink jet recording. Furthermore, the resin particles may enhance the color saturation of the ink.

The second ink may contain second resin particles different from the first resin particles. Although the details of the second resin particles are substantially the same as those of the first resin particles described in the part "1. 1. First Ink", the material used for the second resin particles is different from that of the first resin particles.

The first and second resin particles may change the color saturation of the white ink. Changing the types of resin particles in the first and second inks may provide variations in the color saturation between the case in which the second ink is used alone for recording and the case in which the combination of the first and second inks are ejected substantially at the same time and are mixed with each other on a recording medium.

The second ink may contain a penetrant, saccharides, a dispersant, water, and other additives as in the first ink. Since these components are the same as those described in the part "1. 1. First Ink", detailed description for these components is omitted in this part.

In the case where the second ink contains saccharides, the saccharides adhere to the titanium oxide particles and function to prevent agglomeration of the titanium oxide particles.

1. 3. Other Configurations

The ink set of this embodiment may include other inks. For instance, the ink set of this embodiment may include a third ink which contains third resin particles made from a material different from that of the first resin particles and does not substantially contain a colorant. Except for the third resin particles, the third ink has the substantially same composition as that of the first ink.

Depending on types of the polymers selected to form the first and third resin particles, the first and third resin particles which have adhered onto a recording medium together with the titanium oxide particles may generate variations in the color phase of a formed image. Hence, in the ink set including the third ink, which contains the third resin particles different from the first resin particles contained in the first ink, the color phase of an image to be formed can be changed as a result of adjusting the mixing ratio of the second and third inks to the first ink on a recording medium.

2. Recording Method and Recording Apparatus

In a recording method of this embodiment, the ink set for ink jet recording can be used to form an image at a predetermined position on a recording medium by an ink jet technique.

Although any type of recording medium can be used, non- or low-ink-absorbing media can be used. Examples of the non-ink-absorbing recording media include plastic films having a surface which is not treated for ink jet recording (in particular, plastic films having no ink-absorbing layer), materials having a base, such as paper, which is coated with a plastic material or covered with an adhesive plastic film, glass, and metal. The plastic materials herein used include polyvinyl chloride, polyethylene terephthalate, polycarbonate, polystyrene, polyurethane, polyethylene, and polypropylene. On the other hand, examples of the low-ink-absorbing recording media include printing paper such as art paper, coated paper, and matt paper. Besides these recording media, other types of non- or low-ink-absorbing recording media can be used.

The term "non- or low-ink-absorbing recording medium" herein refers to a recording medium that absorbs 10 mL/m$^2$ or lower of water in 30 msec$^{1/2}$ from the time of contact in the Bristow method. The Bristow method is most widely used as one of quick measurement methods for determining liquid absorption and is also endorsed by Japan Technical Association of the Pulp and Paper Industry (JAPAN TAPPI). The details of this method are specified in Standard No. 51 [Paper and Paperboard-Liquid Absorption Test Method-Bristow's Method (in Japanese)] of *JAPAN TAPPI Paper and Pulp Test Methods* edited in 2000 (in Japanese). Meanwhile, the non- or low-ink-absorbing recording medium is also simply referred to as a plastic medium, where appropriate.

The term "ink jet technique" means a technique used in general ink jet printers and involves ejecting ink from a nozzle and then applying the ink onto a recording medium for image formation. Specific examples of the ink jet technique include traditional techniques such as thermal ink jet, piezoelectric ink jet, serial ink jet, roller application, and spray application.

The recording method of this embodiment has a first process for applying the droplets of at least the first ink to a predetermined position on a recording medium and a second process for applying the droplets of the second ink to a predetermined position on a recording medium. The ink droplets applied to a predetermined position in any one of the first and second processes has fluidity. In this state, the ink droplets are then applied to a predetermined position in the other process.

In other words, the droplets of the first and second inks are ejected substantially at the same time in the recording method of this embodiment. The droplets of the first and second inks are accordingly at least partially mixed with each other before being completely dried and then solidified. The order of the first and second processes is not limited. However, in view of, for example, the abrasion resistance of an image, the first process preferably follows the second process because the titanium oxide particles adhere so as to be close to a recording medium.

The expression "substantially at the same time" herein means that the droplets of the two inks are ejected at such a moment that enables the droplets of the two inks to be mixed with each other. Furthermore, the expression includes the case where one ink is ejected in a state in which the other ink landed on a recording medium has fluidity. Moreover, the expression also includes the following case: for instance, in the case of using a general ink jet printer having a nozzle which moves while facing a recording medium for ink ejection, the first and second inks are ejected in single movement (hereinafter referred to as "single pass", where appropriate) to form one intended image. Accordingly, the expression not only includes the case in which the first and second inks are ejected completely at the same time but also includes the case in which one ink is ejected after ejection of the other ink in the single pass.

The droplets of one of the two inks ejected in single scanning contact the droplets of the other of the two inks on a recording medium. In this case, the droplets of one ink may be applied onto a recording medium in advance, and the droplets of the other ink may then contact the existing droplets. The droplets of the two inks may be applied onto a recoding medium substantially at the same time and then contact each other. Recording to a single recording medium may finish through the movement of a nozzle at several times or through quick movement of the nozzle to the recording medium only at one time. Examples of the latter case include use of a line printer having a recording head with a length corresponding to the width of a recording medium. Also with such a printer, the droplets of the first and second inks can be applied substantially at the same time so as to at least partially contact each other on a recording medium.

A recording apparatus used in the recording method of this embodiment preferably has a first recording mode and a second recording mode, the first recording mode involving ejecting the first and second inks substantially at the same time and then applying the first and second inks onto a recording medium, and the second recording mode involving ejecting the second ink substantially not at the same time as the ejection of the first ink and then applying the second ink onto a predetermined position on a recording medium. The first recording mode can provide a white image having a higher L* value and degree of hiding than those of an image formed by the second recording mode and having color saturation different from that of an image formed by the second recording mode. The second recording mode can reduce the consumption of the first ink and is therefore more preferable than the first recording mode. The first and second recording modes can be selected on the basis of an input image and instructions from users.

In the recording method of this embodiment, the droplets of the first ink preferably have a weight that is in the range from 20% to 50% of that of the droplets of the second ink, which can enhance the drying property of an image formed on a plastic medium.

The term "white ink" herein refers to an ink which enables recording with color generally accepted as "white" and includes an ink involving slight coloration. The term also includes ink which is called "white ink" and is sold under the name of "white ink" while containing a pigment. Furthermore, the term also includes ink which satisfies the following requirement: in the case of using ink for recording on photo paper "glossy" manufactured by SEIKO EPSON CORPORATION in 100% or higher duty or in an amount which enables a surface of the photo paper to be sufficiently coated, measurement of the brightness (L*) and chromaticity (a* and b*) of the ink provides the results of 70≤L*≤100, −4.5≤a*≤2, and −6≤b*≤2.5, the measurement being conducted with a spectrophotometer "Spectrolino" (product name, manufactured by GRETAG MACBETH AG) under conditions of a light source: D50, viewing angle: 2°, color density: DIN NB, white reference: Abs, filter: No, and measurement mode: Reflectance.

The recording mode of the recording apparatus may be selected, for instance, depending on the optical transparency of a recording medium. In particular, the recording apparatus may have a determination unit that determines the optical transparency of a recording medium. In an example of the determination unit, users input the information of a recording medium, such as type and properties (photo transparency), to a host device, and the determination unit receives the information for the determination. In another example of the determination unit, the screen of a host device displays a check box for the determination of the photo transparency of a recording medium, and the determination unit receives information for the determination when the box is checked. Furthermore, the recording apparatus may have a sensor which directly detects the optical transparency, and the determination unit may receive the detection results for the determination. Although types of the determination unit are not specifically limited, the determination unit may be, for instance, a central processing unit (CPU) or application specific integrated circuits (ASIC). This configuration enables the recording mode to be selected on the basis of the necessary degree of hiding and, for example, enables a white base layer to be sufficiently formed.

The recording method of this embodiment may use the above ink set including the first to third inks. A recording apparatus used in this case preferably has a first recording mode, a second recording mode, and a third recording mode, the first recording mode involving ejecting the first and second inks substantially at the same time and then applying the first and second inks onto a recording medium, the second recording mode involving ejecting the second ink substantially not at the same time as ejection of the first ink and then applying the second ink onto a predetermined position on the recording medium, and the third recording mode involving ejecting the second and third inks substantially at the same time and then applying the second and third inks onto a predetermined position on the recording medium. These three modes may be selected depending on the optical transparency of a recording medium as described above.

In the recording method, these modes can be individually used in response to the intended color phase of an image to be formed. The recording apparatus of this embodiment accordingly enables, for example, the color tone of a white base layer to be easily changed.

The recording mode of the recording apparatus may be selected depending on the color tone of a recording medium. Since the recording mode is selected in this way, selection of the recording mode corresponding to a required color tone enables, for example, the color tone of a white base layer to be easily changed. The recording mode may be selected by users or automatically selected by a mechanism provided to the recording apparatus in order to analyze the color tone of a recording medium.

3. Examples

Although the invention will be hereinafter described further in detail with reference to examples, the scope of the invention should not be limited to the examples.

3. 1. Preparation of Ink

White inks A1 to A10, white ink B (corresponding to the second ink of the above embodiment, which does not substantially contain the resin particles), and resin inks C1 to C10 (corresponding to the first ink of the above embodiment) were each prepared in composition listed in Table 1.

TABLE 1

| | | Types of resin particles | Average particle diameter of resin particles (nm) | Amount (weight %) | | | | | | |
|---|---|---|---|---|---|---|---|---|---|---|
| | | | | Resin particles | Titanium dioxide particles | 1,2-hexanediol | HS-500 | Propylene glycol | BYK-348 | Water |
| White inks | A1 | JONCRYL 61J | 40 | 3 | 10 | 5 | 7 | 7 | 0.5 | Balance |
| | A2 | Vinyblan 700 | 30 | 3 | 10 | 5 | 7 | 7 | 0.5 | Balance |
| | A3 | RESAMINE D-1060 | 150 | 3 | 10 | 5 | 7 | 7 | 0.5 | Balance |
| | A4 | Mowinyl 742A | 110 | 3 | 10 | 5 | 7 | 7 | 0.5 | Balance |
| | A5 | Mowinyl 972 | 140 | 3 | 10 | 5 | 7 | 7 | 0.5 | Balance |
| | A6 | JONCRYL 61J | 40 | 6 | 10 | 5 | 7 | 5 | 0.5 | Balance |
| | A7 | Vinyblan 700 | 30 | 6 | 10 | 5 | 7 | 5 | 0.5 | Balance |
| | A8 | RESAMINE D-1060 | 150 | 6 | 10 | 5 | 7 | 5 | 0.5 | Balance |
| | A9 | Mowinyl 742A | 110 | 6 | 10 | 5 | 7 | 5 | 0.5 | Balance |
| | A10 | Mowinyl 972 | 140 | 6 | 10 | 5 | 7 | 5 | 0.5 | Balance |
| | B | Not used | — | — | 10 | 5 | 7 | 10 | 0.5 | Balance |
| Resin Inks | C1 | JONCRYL 61J | 40 | 5 | — | 5 | 7 | 5 | 0.2 | Balance |
| | C2 | Vinyblan 700 | 30 | 5 | — | 5 | 7 | 5 | 0.2 | Balance |
| | C3 | RESAMINE D-1060 | 150 | 5 | — | 5 | 7 | 5 | 0.2 | Balance |
| | C4 | Mowinyl 742A | 110 | 5 | — | 5 | 7 | 5 | 0.2 | Balance |
| | C5 | Mowinyl 972 | 140 | 5 | — | 5 | 7 | 5 | 0.2 | Balance |

In Table 1, the resin particles include JONCRYL 61J (styrene-acrylic acid copolymer, manufactured by BASF Japan Ltd.), Vinyblan 700 (polyvinyl chloride, manufactured by Nissin Chemical Industry Co., Ltd.), RESAMINE D-1060 (urethane resin, manufactured by Dainichiseika Color & Chemicals Mfg. Co., Ltd.), and Mowinyl 742A (acrylic resin) and Mowinyl 972 (styrene-acrylic resin) (each being manufactured by The Nippon Synthetic Chemical Industry Co., Ltd.) A NanoTek (registered trademark) Slurry (manufactured by C. I. Kasei Company, Limited) was used for the titanium dioxide particles in Table 1, the NanoTek Slurry containing the titanium dioxide particles having an average particle diameter of 300 nm in a 15% solid content concentration. In Table 1, the concentration of the titanium dioxide particles and resin particles is indicated as a solid content concentration in the unit of weight %. In Table 1, HS-500 is a sugar manufactured by HAYASHIBARA CO., LTD. In Table 1, BYK-348 is a polysiloxane surfactant manufactured by BYK Japan KK. Water was ion-exchanged water.

3. 2. Evaluation of Clogging and Solidification

Clogging was evaluated as follows. The above inks were individually put into the ink chamber of the cartridge of an ink jet printer (product name "PX-G930" manufactured by SEIKO EPSON CORPORATION). The ink cartridge was disposed to the printer and was left under environment of 25°

C. and 50% relative humidity (RH) for six months. The number of clogged nozzles was counted in each cleaning.

The results were evaluated on the basis of the following criteria, and the evaluation results are listed in Table 2.

A: The clogging was overcome by the cleaning within five times;

B: The clogging was overcome by the cleaning within 10 times; and

C: The clogging was overcome by the cleaning of more than 11 times.

Solidification was evaluated as follows. The above inks were individually put into 100 mL screw cap bottles (manufactured by AS ONE Corporation) in an amount of 100 mL and left under environment of 25° C. and 50% RH for six months. The bottles were subsequently shaken up and down 10 times in a distance of 30 cm. Supernatant solutions (3 mL) of the inks in the bottles were then collected.

Distilled water was added to the collected supernatant solutions (1 g) for dilution by 1000 times. A spectrophotometer U-3300 (product name, manufactured by Hitachi, Ltd.) was then used to measure the absorbance (Abs value) of the composition of the diluted white ink in a wavelength of 500 nm on the basis of the number of stirring. The resulting absorbance of the individual samples was compared with the absorbance of the white ink immediately after the preparation, and the recovery rate of absorbance was determined from Formula (1).

Recovery rate (%) of absorbance=100×absorbance of sample/absorbance immediately after preparation   (1)

The results were evaluated on the basis of the following criteria and are listed in Table 2.

A: Recovery rate was 90% or higher;

B: Recovery rate was 70% or higher and less than 90%; and

C: Recovery rate was less than 70%.

3. 3. Evaluation of Whiteness, Degree of Hiding, and Abrasion Resistance

Tables 3 and 4 illustrate the evaluation results of whiteness, the degree of hiding, and abrasion resistance.

TABLE 3

| White inks | | Resin Inks | | Evaluation results | | | | |
| --- | --- | --- | --- | --- | --- | --- | --- | --- |
| Types | duty (%) | Types | duty (%) | L* | a* | b* | Hiding degree | Abrasion resistance |
| B | 70 | — | 0 | 68.4 | | | 950 | X |
| B | 70 | C1 | 20 | 71 | | | 502 | Δ |
| B | 70 | C1 | 30 | 71.4 | | | 420 | Δ |
| B | 70 | C1 | 42 | 71.9 | −2.47 | −5.52 | 300 | ○ |
| B | 70 | C1 | 45 | 72 | | | 280 | ○ |
| B | 70 | C1 | 60 | 72.3 | | | 231 | ○ |
| B | 70 | C2 | 20 | 68.5 | | | 802 | ○ |
| B | 70 | C2 | 30 | 68.6 | | | 711 | ○ |
| B | 70 | C2 | 42 | 69 | −3.04 | −6.35 | 570 | ○ |
| B | 70 | C2 | 45 | 69.2 | | | 558 | ○ |
| B | 70 | C2 | 60 | 70 | | | 480 | ○ |
| B | 70 | C3 | 20 | 67.8 | | | 799 | ○ |
| B | 70 | C3 | 30 | 67.8 | | | 602 | ○ |
| B | 70 | C3 | 42 | 68.2 | −2.9 | −6.01 | 480 | ○ |
| B | 70 | C3 | 45 | 68.3 | | | 459 | ○ |
| B | 70 | C3 | 60 | 69.3 | | | 322 | ○ |
| B | 70 | C4 | 20 | 72.9 | | | 191 | ○ |
| B | 70 | C4 | 30 | 73.5 | | | 169 | ○ |
| B | 70 | C4 | 42 | 73.5 | −1.53 | −3.48 | 145 | ○ |
| B | 70 | C4 | 45 | 73.5 | | | 137 | ○ |
| B | 70 | C4 | 60 | 73.5 | | | 118 | ○ |
| B | 70 | C5 | 20 | 74.1 | | | 150 | ○ |
| B | 70 | C5 | 30 | 74.9 | | | 122 | ○ |
| B | 70 | C5 | 42 | 75.6 | −1.76 | −4.13 | 101 | ○ |
| B | 70 | C5 | 45 | 75.8 | | | 99 | ○ |
| B | 70 | C5 | 60 | 76.2 | | | 72 | ○ |
| A1 | 70 | — | — | 71.2 | −2.32 | −5.54 | 404 | ○ |
| A2 | 70 | — | — | 70.2 | −2.64 | −5.88 | 581 | ○ |
| A3 | 70 | — | — | 69.8 | −3.01 | −4.23 | 633 | ○ |
| A4 | 70 | — | — | 72.1 | −2.11 | −3.61 | 161 | ○ |
| A5 | 70 | — | — | 74.6 | −1.52 | −4.29 | 136 | ○ |

TABLE 2

| | Evaluation results | |
| --- | --- | --- |
| Types of ink | Clogging | Solidification |
| A1 | Δ | Δ |
| A2 | Δ | Δ |
| A3 | ○ | Δ |
| A4 | Δ | Δ |
| A5 | Δ | Δ |
| A6 | Δ | X |
| A7 | X | X |
| A8 | Δ | X |
| A9 | X | X |
| A10 | X | X |
| B | ○ | ○ |
| C1 | ○ | — |
| C2 | ○ | — |
| C3 | ○ | — |
| C4 | ○ | — |
| C5 | ○ | — |

TABLE 4

| White inks | | Resin Inks | | | Evaluation results | |
| --- | --- | --- | --- | --- | --- | --- |
| Types | duty (%) | Types | duty (%) | L* | Hiding degree | Abrasion resistance |
| B | 50 | — | 0 | 65.3 | 1465 | X |
| B | 50 | C1 | 20 | 68.1 | 846 | Δ |
| B | 50 | C1 | 30 | 68.2 | 672 | Δ |
| B | 50 | C1 | 42 | 69 | 480 | ○ |
| B | 50 | C1 | 45 | 69.1 | 448 | ○ |
| B | 50 | C1 | 60 | 69.3 | 420 | ○ |
| B | 50 | C2 | 20 | 65.8 | 1283 | ○ |
| B | 50 | C2 | 30 | 65.9 | 1136 | ○ |
| B | 50 | C2 | 42 | 66.3 | 965 | ○ |
| B | 50 | C2 | 45 | 66.4 | 912 | ○ |
| B | 50 | C2 | 60 | 67 | 769 | ○ |
| B | 50 | C3 | 20 | 64.8 | 1460 | ○ |
| B | 50 | C3 | 30 | 64.9 | 1296 | ○ |
| B | 50 | C3 | 42 | 65.5 | 986 | ○ |
| B | 50 | C3 | 45 | 65.6 | 954 | ○ |
| B | 50 | C3 | 60 | 66.4 | 840 | ○ |
| B | 50 | C4 | 20 | 70 | 506 | ○ |
| B | 50 | C4 | 30 | 70.5 | 420 | ○ |
| B | 50 | C4 | 42 | 71.1 | 360 | ○ |
| B | 50 | C4 | 45 | 71.3 | 331 | ○ |
| B | 50 | C4 | 60 | 72.2 | 291 | ○ |
| B | 50 | C5 | 20 | 71.9 | 387 | ○ |
| B | 50 | C5 | 30 | 72.7 | 294 | ○ |

TABLE 4-continued

| White inks | | Resin Inks | | | Evaluation results | |
| --- | --- | --- | --- | --- | --- | --- |
| Types | duty (%) | Types | duty (%) | L* | Hiding degree | Abrasion resistance |
| B | 50 | C5 | 42 | 73.5 | 257 | ○ |
| B | 50 | C5 | 45 | 73.5 | 240 | ○ |
| B | 50 | C5 | 60 | 74.3 | 202 | ○ |

Samples used for the evaluation of the whiteness, the degree of hiding, abrasion resistance were prepared as follows.

The white inks and resin inks listed in Tables 3 and 4 were individually put into the ink chamber of the cartridge of an ink jet printer (product name "PX-G930" manufactured by SEIKO EPSON CORPORATION). A solid image pattern was recorded on a recording medium [clear proofing film (CRF) WXCPFT27R manufactured by SEIKO EPSON CORPORATION]. The recording was conducted in a resolution of 1440×1440 dpi and in duties listed in Tables 3 and 4.

In this case, the term "duty" means values determined from the following formula.

duty (%)=number of actually printed dots/(longitudinal resolution×lateral resolution)×100

(wherein, the term "number of actually printed dots" refers to the number of actually printed dots per unit area, the terms "longitudinal resolution" and "lateral resolution" each refer to resolution per unit length, and the term "100% duty" refers to the maximum ink weight of a single color with respect to a pixel).

The recording was conducted such that the droplets of the white ink were applied on a recording medium and that the droplets of the resin ink were then applied to the position of the white ink on the recording medium. In the recording, the droplets of the resin ink were applied while the droplets of the white ink had fluidity on the recording medium. In particular, the ejection of the resin ink followed the ejection of the white ink in single movement of the head of the ink jet printer. The time taken between the application of the white ink on the recording medium and arrival of the resin ink to the white ink was approximately 0.1 ms. Meanwhile, a separate experiment indicated that the individual inks were not dried in 1.5 ms after the application on the recording medium and had fluidity.

The individual samples were analyzed with analyzers Gretag Macbeth Spectroscan and Spectrolino (manufactured by X-Rite, Inc.) to determine L* values, a* values, and b* values, and the whiteness was evaluated on the basis of the L* values as the indicator of the whiteness. The resulting L* values, a* values, and b* values are listed in Tables 3 and 4.

The optical transmittance of the individual samples in a visible light region was measured to determine the degree of hiding, and the degree of hiding is listed in Tables 3 and 4. The degree of hiding was specifically determined as follows. A spectrophotometer (V550 UV/VIS, manufactured by JASCO Corporation) was used to analyze the optical transmittance of the individual samples in a visible light region by an analysis program "Spectra Manager for windows 95/NT (ver. 1.53.01, manufactured by JASCO Corporation) under the conditions of analysis mode: transmission mode (% T), polarization data: N polarization, number of times: 1, response: Fast, band width: 10.0 nm, scanning rate: 2000 nm/min, and data-taking interval: 1.0 nm.

The integrated value of the optical transmittance was obtained as a result of integrating the optical transmittance in a wavelength of every 1 nm within the range from 380 nm to 700 nm. The integrated value was in the range from 0 to 32000. The value 0 indicates complete hiding (shielding), and the value 32000 indicates complete transmission.

For the evaluation of the abrasion resistance, individual samples were dried at 60° C. and 20% RH for 2 hours, and a COLOR FASTNESS RUBBING TESTER (manufactured by YASUDA SEIKI SEISAKUSHO, LTD.) was used to rub the printing region of the samples 100 times by using Standard Adjacent Fabrics for Staining of Color Fastness Test (manufactured by Japanese Standards Association).

The results were evaluated on the basis of the following criteria, and the evaluation results are listed in Tables 3 and 4.

A: Not removed;

B: Less than 10% area of the printing region was removed; and

C: 10% or lager area of the printing region was removed.

3. 4. Evaluation Results of Examples

With reference to Table 2, the white inks A1 to A10 had unsatisfactory properties in the clogging and solidification as compared with the white ink B. This result demonstrates that both of the titanium oxide particles and resin particles contained in the white ink caused agglomerate and solidification (hard-caking) of the titanium oxide particles. The white inks A1 to A5 had better properties in the clogging and solidification relative to those of the white inks A6 to A10. This result demonstrates that the first resin particle content at a concentration of approximately 3% in the white ink was effective to suppress the occurrence of the agglomerate and solidification of the titanium oxide particles. In contrast, the white ink B, which did not contain the resin particles, was free from the occurrence of the clogging and solidification even after preservation for six months. In addition, the white ink B had excellent preservation stability. These results accordingly demonstrate the following: the white ink contained small amount (approximately 3 weight % or lower) of resin particles, or the white ink did not contain the resin particles while the resin ink contains resin particles, thereby being able to imparting enhanced preservation stability to the ink set including the white ink as compared with white ink containing the resin particles.

With reference to Table 3, the L* values increased with the increase of the duty of the resin ink. In Table 3, whiteness was compared between images recorded by the white inks B and the resin inks C1 to C4 and images recorded by the white inks A1 to A5 in duty which enabled solid content to be equal in the both image (42% duty in the resin ink). The comparison gave the results in which the whiteness was equal to each other or the former had larger whiteness. The images formed by the resin inks C1, C4, and C5 especially had the whiteness more excellent than that of the images formed by the white inks A1, A4, and A5. In other words, these results demonstrates the following: in the case of using the resin particles of acrylic resin or the resin particles of styrene-acrylic copolymer, the resin particles delivered by the resin ink contributed to high whiteness as compared with the resin particles contained in the white ink. In addition, the resin particles used for the resin inks C1, C4, and C5 had an average particle diameter ranging from 40 nm to 140 nm, and it was also found that this average particle diameter served for the enhancement of the whiteness.

With reference to Table 3, the a* and b* values changed depending on types of the resin particles used. This result demonstrates that the color phase (color) of a white image to be formed can be changed depending on types of the resin particles used.

With reference to Tables 3 and 4, the degree of hiding decreased with the increase in duty of the resin ink, resulting in formation of an image having a high hiding property. The degree of hiding was compared between images recorded by the white inks B and the resin inks C1 to C4 and images recorded by the white inks A1 to A5 in duty which enabled solid content to be equal in the both image (42% duty in the resin ink). The comparison gave the results in which the former had the good degree of hiding. The images formed by the resin inks C1 and C3 especially had the significantly enhanced degree of hiding as compared with the images formed by the white inks A1 and A3. In other words, these results demonstrate the following: in the case of using the resin particles of styrene-acrylic copolymer or the resin particles of urethane resin, the resin particles delivered by the resin ink contributed to the good degree of hiding as compared with the resin particles contained in the white ink.

Although the reasons for these results have been still studying, use of the white ink and resin ink makes the titanium oxide particles further evenly disperse in an image as compared with use of the white ink alone, and it is believed that this advantage is one of the reasons for these results.

It was found that any type of resin particles contained in an image was able to provide good abrasion resistance. However, the resin ink C1 provided slightly unsatisfactory abrasion resistance in 30% or lower duty.

Figure 1:
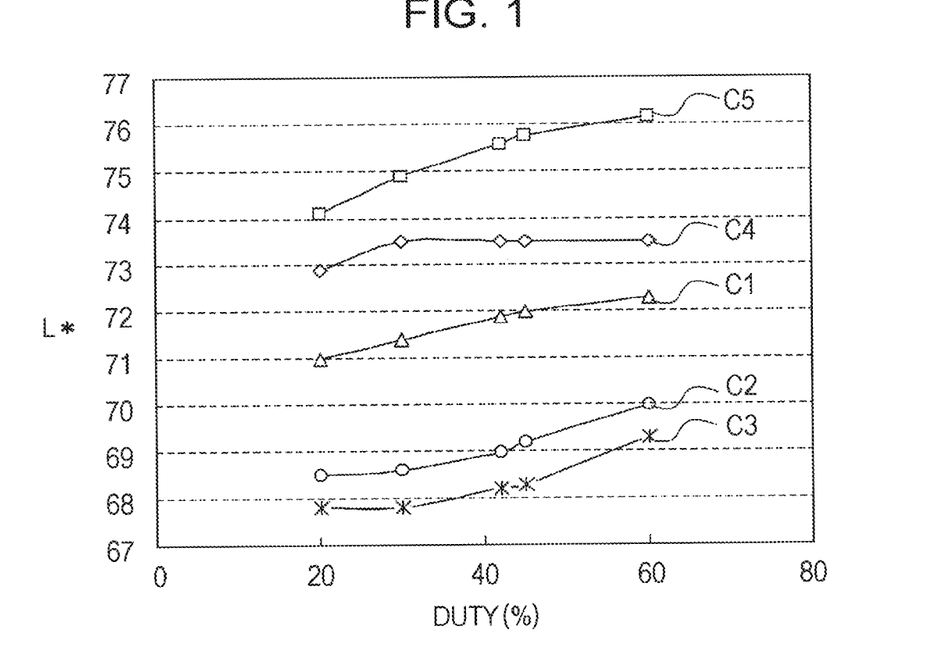
FIG. 1 is a graph illustrating the relationship between duty and the L* value of images in examples.
Figure 2:
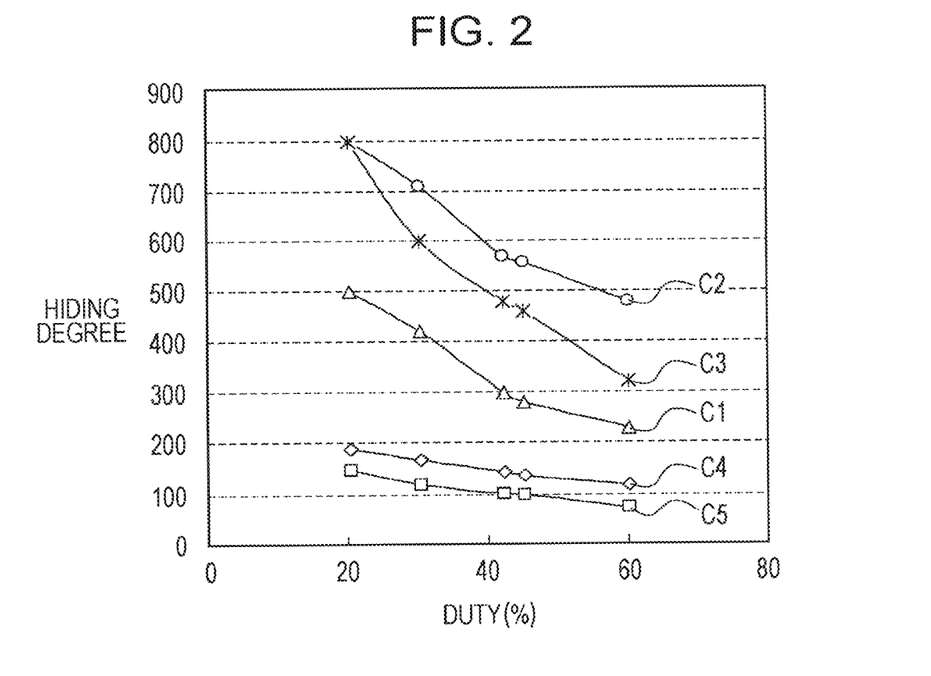
FIG. 2 is a graph illustrating the relationship between duty and the degree of hiding of images in examples.

FIG. 1 illustrates the relationship of the duty and the L* value in the resin inks of the samples in Table 3. FIG. 2 illustrates the relationship of the duty and the degree of hiding in the resin inks of the samples in Table 3.

With reference to Table 4, as in Table 3, the L* values increased with the increase in duty of the resin ink. The images formed by the resin inks C1, C4, and C5 had especially excellent whiteness. In particular, it was found that the resin particles of acrylic resin or the resin particles of styrene-acrylic copolymer provided high whiteness. In addition, the resin particles used for the resin inks C1, C4, and C5 had an average particle diameter ranging from 40 nm to 140 nm, and it was also found that this average particle diameter served for the enhancement of the whiteness.

With reference to Table 4, the degree of hiding decreased with the increase in duty of the resin ink, resulting in formation of an image having a high hiding property. The images formed by the resin inks C4 and C5 especially had significantly enhanced hiding property. In particular, it was found that the resin particles of acrylic resin or the resin particles of styrene-acrylic copolymer provided the good degree of hiding.

Although the reasons for these results have been still studying, use of the white ink and resin ink makes the titanium oxide particles further evenly disperse in an image as compared with use of the white ink alone, and it is believed that this advantage is one of the reasons for these results.

It was found that any type of resin particles contained in an image was able to provide good abrasion resistance. However, the resin ink C1 provided slightly unsatisfactory abrasion resistance in 30% or lower duty.

The invention should not be limited to the above embodiments and can be variously modified. The invention may include, for example, configurations substantially the same as those described in the embodiments (for instance, configurations having the same functions, processes, and results or having the same objects and advantageous effects as those in the embodiments). In addition, the invention may include configurations provided by changing non-essential parts of the configurations described in the embodiments. Furthermore, the invention may include configurations which can provide the effects the same as those described in the embodiments or which can provide the advantages the same as those in the above embodiments. Still furthermore, the invention may include configurations in which a well-known technique is added to the configurations described in the embodiments.

What is claimed is:

1. An ink set for ink jet recording, the ink set comprising:
a first ink containing first resin particles and not substantially containing a colorant; and
a second ink containing titanium oxide particles and containing the first resin particles in an amount less than 6 weight %, the second ink being ejected substantially at the same time as ejection of the first ink,
wherein the first resin particles have an average particle diameter that is in the range from 40 nm to 140 nm.

2. The ink set for ink jet recording according to claim 1, wherein
the second ink contains second resin particles different from the first resin particles.

3. A recording apparatus comprising:
the ink set for ink jet recording according to claim 2, wherein
the recording apparatus forms an image at a predetermined position on a recording medium by an ink jet technique.

4. A recording apparatus comprising:
the ink set for ink jet recording according to claim 2, wherein
the recording apparatus has a first recording mode and a second recording mode, the first recording mode involving ejecting the first and second inks substantially at the same time and then applying the first and second inks to a predetermined position on a recording medium, and the second recording mode involving ejecting the first and second inks substantially not at the same time and then applying the first and second inks to a predetermined position on a recording medium.

5. The recording apparatus according to claim 4, further comprising:
a determination unit that determines the optical transparency of the recording medium, wherein
any one of the recording modes is selected on the basis of the determination result by the determination unit.

6. The ink set for ink jet recording according to claim 1, wherein
the first ink contains the first resin particles in an amount that is in the range from 3 weight % to 5 weight %.

7. A recording apparatus comprising:
the ink set for ink jet recording according to claim 6, wherein
the recording apparatus forms an image at a predetermined position on a recording medium by an ink jet technique.

8. The ink set for ink jet recording according to claim 1, wherein
the material of the first resin particles is an acrylic polymer.

9. A recording apparatus comprising:
the ink set for ink jet recording according to claim 8, wherein
the recording apparatus forms an image at a predetermined position on a recording medium by an ink jet technique.

10. The ink set for ink jet recording according to claim 1, further comprising:
a third ink containing third resin particles different from the first resin particles and not substantially containing a colorant.

11. A recording apparatus comprising:
the ink set for ink jet recording according to claim 10, wherein
the recording apparatus forms an image at a predetermined position on a recording medium by an ink jet technique.

12. A recording apparatus comprising:
the ink set for ink jet recording according to claim 10, wherein
the recording apparatus has a first recording mode, a second recording mode, and a third recording mode, the first recording mode involving ejecting the first and second inks substantially at the same time and then applying the first and second inks to a predetermined position on a recording medium, the second recording mode involving ejecting the first and second inks substantially not at the same time and then applying the first and second inks to a predetermined position on a recording medium, and the third recording mode involving ejecting the second and third inks substantially at the same time and then applying the second and third inks to a predetermined position on a recording medium.

13. The recording apparatus according to claim 12, further comprising:
a determination unit that determines the optical transparency of the recording medium, wherein
any one of the recording modes is selected on the basis of the determination result by the determination unit.

14. A recording apparatus comprising:
the ink set for ink jet recording according to claim 1, wherein
the recording apparatus forms an image at a predetermined position on a recording medium by an ink jet technique.

15. A recorded matter formed by the recording apparatus according to claim 14.

16. A recording apparatus comprising:
the ink set for ink jet recording according to claim 1, wherein
the recording apparatus has a first recording mode and a second recording mode, the first recording mode involving ejecting the first and second inks substantially at the same time and then applying the first and second inks to a predetermined position on a recording medium, and the second recording mode involving ejecting the first and second inks substantially not at the same time and then applying the first and second inks to a predetermined position on a recording medium.

17. The recording apparatus according to claim 16, further comprising:
a determination unit that determines the optical transparency of the recording medium, wherein
any one of the recording modes is selected on the basis of the determination result by the determination unit.

\* \* \* \* \*